(12) United States Patent
Yamamura et al.

(10) Patent No.: US 8,810,051 B2
(45) Date of Patent: Aug. 19, 2014

(54) INVERTER GENERATOR

(75) Inventors: Yoichi Yamamura, Wako (JP); Minoru Tamura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 43 days.

(21) Appl. No.: 13/472,551

(22) Filed: May 16, 2012

(65) Prior Publication Data

US 2012/0292902 A1 Nov. 22, 2012

(30) Foreign Application Priority Data

May 17, 2011 (JP) ................................. 2011-110565
May 17, 2011 (JP) ................................. 2011-110566

(51) Int. Cl.
| | | |
|---|---|---|
| *F02N 11/04* | (2006.01) | |
| *H02K 23/52* | (2006.01) | |
| *H02P 9/04* | (2006.01) | |
| *B60L 11/14* | (2006.01) | |
| *F02B 63/04* | (2006.01) | |
| *F03G 7/08* | (2006.01) | |
| *F02N 11/08* | (2006.01) | |

(52) U.S. Cl.
CPC ............ *F02N 11/04* (2013.01); *Y02T 10/7077* (2013.01); *B60L 11/14* (2013.01); *F02N 2011/0896* (2013.01); *F02N 2011/0892* (2013.01)
USPC .............. 290/31; 290/1 R; 290/40 B; 310/74; 363/37

(58) Field of Classification Search
CPC ..... H02J 7/0052; H02J 7/022; H02M 3/1586; H02M 3/1582; F02B 63/04; F02D 9/06; H02P 25/22; H02P 27/08; H02P 9/006; H02P 9/02

USPC ................ 290/1 R, 31, 40 B; 310/74; 363/37
See application file for complete search history.

(56) References Cited

U.S. PATENT DOCUMENTS 4,883,973 A * 11/1989 Lakey et al. ..................... 290/31
5,852,554 A * 12/1998 Yamamoto ...................... 363/71
(Continued)

FOREIGN PATENT DOCUMENTS

| | | | | |
|---|---|---|---|---|
| JP | 2004-340055 | | 12/2004 | |
| JP | 2012244689 A | * | 12/2012 | ................ H02P 9/04 |
| JP | 2012244690 A | * | 12/2012 | ................ H02P 9/08 |

OTHER PUBLICATIONS

Russian Office Action with English Translation dated Oct. 11, 2013, 7 pages.
(Continued)

*Primary Examiner* — Pedro J Cuevas
(74) *Attorney, Agent, or Firm* — Rankin, Hill & Clark LLP (57) ABSTRACT

In an inverter generator having a winding wound around a generator unit driven by an engine, a converter connected to the winding and adapted to convert an alternating current outputted from the winding to a direct current, an inverter connected to the converter and adapted to invert the direct current outputted from the converter to an alternating current and output it, and a controller adapted to control operations of the converter and the inverter, a battery is connected to the engine, and the winding includes a first winding and a second winding, such that the controller supplies an output of the battery to one of the first winding and the second winding to rotate the generator unit to start the engine.

8 Claims, 7 Drawing Sheets

(56) References Cited

U.S. PATENT DOCUMENTS

| | | | |
|---|---|---|---|
| 6,177,734 B1* | 1/2001 | Masberg et al. | 290/31 |
| 6,236,583 B1* | 5/2001 | Kikuchi et al. | 363/132 |
| 6,256,213 B1* | 7/2001 | Illingworth | 363/89 |
| 6,414,400 B1* | 7/2002 | Scott et al. | 290/40 C |
| 6,603,227 B2* | 8/2003 | Rose, Sr. | 310/74 |
| 6,617,725 B2* | 9/2003 | Rose, Sr. | 310/74 |
| 6,621,719 B2* | 9/2003 | Steimer et al. | 363/43 |
| 6,777,846 B2* | 8/2004 | Feldner et al. | 310/200 |
| 6,864,606 B2* | 3/2005 | Rose, Sr. | 310/74 |
| 6,937,484 B2* | 8/2005 | Nakamura et al. | 363/36 |
| 6,954,366 B2* | 10/2005 | Lai et al. | 363/71 |
| 7,068,524 B2* | 6/2006 | Nakagawa et al. | 363/67 |
| 7,471,004 B2* | 12/2008 | Kanazawa et al. | 290/40 B |
| 7,511,975 B2* | 3/2009 | Hammond | 363/49 |
| 7,609,022 B2* | 10/2009 | Oyobe et al. | 318/800 |
| 8,254,076 B2* | 8/2012 | Ledezma et al. | 361/118 |
| 8,581,425 B2* | 11/2013 | Rozman et al. | 290/1 A |
| 8,618,681 B2* | 12/2013 | Yamamura et al. | 290/40 B |
| 8,638,003 B2* | 1/2014 | Hashimoto et al. | 290/27 |
| 2002/0149277 A1* | 10/2002 | Feldner et al. | 310/68 R |
| 2002/0149287 A1* | 10/2002 | Rose, Sr. | 310/254 |
| 2003/0034712 A1* | 2/2003 | Rose, Sr. | 310/254 |
| 2003/0189338 A1* | 10/2003 | Rose, Sr. | 290/1 R |
| 2004/0012204 A1 | 1/2004 | Walter et al. | |
| 2004/0036295 A1 | 2/2004 | Nakagawa et al. | |
| 2004/0120167 A1* | 6/2004 | Nakamura et al. | 363/37 |
| 2005/0264266 A1* | 12/2005 | Nakagawa et al. | 322/25 |
| 2006/0043940 A1* | 3/2006 | Wang | 322/24 |
| 2007/0274109 A1* | 11/2007 | Oyobe et al. | 363/37 |
| 2010/0127669 A1* | 5/2010 | Iida | 320/162 |
| 2012/0291739 A1* | 11/2012 | Hashimoto et al. | 123/179.3 |
| 2012/0292920 A1* | 11/2012 | Yamamura et al. | 290/40 B |
| 2012/0293004 A1* | 11/2012 | Hashimoto et al. | 307/82 |
| 2012/0293140 A1* | 11/2012 | Hashimoto | 322/94 |
| 2013/0231811 A1* | 9/2013 | Aoki | 701/22 |
| 2013/0271077 A1* | 10/2013 | Kim et al. | 320/109 |

OTHER PUBLICATIONS

Russian Office Action with English translation dated Mar. 27, 2014, 6 pages.

* cited by examiner

INVERTER GENERATOR

BACKGROUND OF THE INVENTION

1. Technical Field

Embodiments of the invention relate to an inverter generator, particularly to an inverter generator equipped with a generator unit driven by an engine.

2. Background Art

Conventionally, a technique for an inverter generator equipped with a generator unit driven by an engine is widely known in which a starter motor (cell motor) is used to crank the engine to start it. However, such a configuration is disadvantageous because the installation of the starter motor causes increase in size of the generator.

To deal with it, in Japanese Laid-Open Patent Application No. 2004-340055, the starter motor is removed and a battery output is supplied to the generator unit to rotate it so as to start the engine, i.e., the generator unit is utilized as the starter motor to start the engine, thereby making the generator compact.

SUMMARY

In the case of being configured as in the reference, it is necessary to boost a battery voltage through a converter to a level that enables the generation unit to rotate so that it can work as the starter motor. The voltage that enables the rotating operation of the generator unit as above is proportional to a set value of an output voltage of the generator unit, i.e., a line-to-line voltage to be generated at a winding wound around the generator unit when power is generated.

Accordingly, when, for instance, the line-to-line voltage of the winding is set relatively high, the voltage that enables the rotating operation is also increased, so that a boost ratio of the converter also rises and it leads to increase in size of the converter. As a result, the generator as a whole is increased in weight and size, disadvantageously. In addition, as to parts (e.g., a capacitor, etc.) to which a relatively-high voltage is applied from the generator unit at power generation, a voltage-endurance property is needed to be enhanced, resulting in increase in size and cost. It is also inconvenient.

An object of embodiments of this invention is therefore to overcome the foregoing problem by providing an inverter generator equipped with a generator unit driven by an engine, which can start the engine using the generator unit and can be made light and compact without increasing cost.

In order to achieve the object, the embodiments provide in the first aspect an inverter generator having a winding wound around a generator unit driven by an engine, a converter connected to the winding and adapted to convert an alternating current outputted from the winding to a direct current, an inverter connected to the converter and adapted to invert the direct current outputted from the converter to an alternating current and output it, and a controller adapted to control operations of the converter and the inverter, wherein the improvement comprises: a battery connected to the engine, and the winding includes a first winding and a second winding, such that the controller supplies an output of the battery to one of the first winding and the second winding to rotate the generator unit to start the engine.

BRIEF DESCRIPTION OF DRAWINGS

The above and other objects and advantages will be more apparent from the following description and drawings in which.

DESCRIPTION OF EMBODIMENTS

An inverter generator according to embodiments of the present invention will now be explained with reference to the attached drawings.

Figure 1:
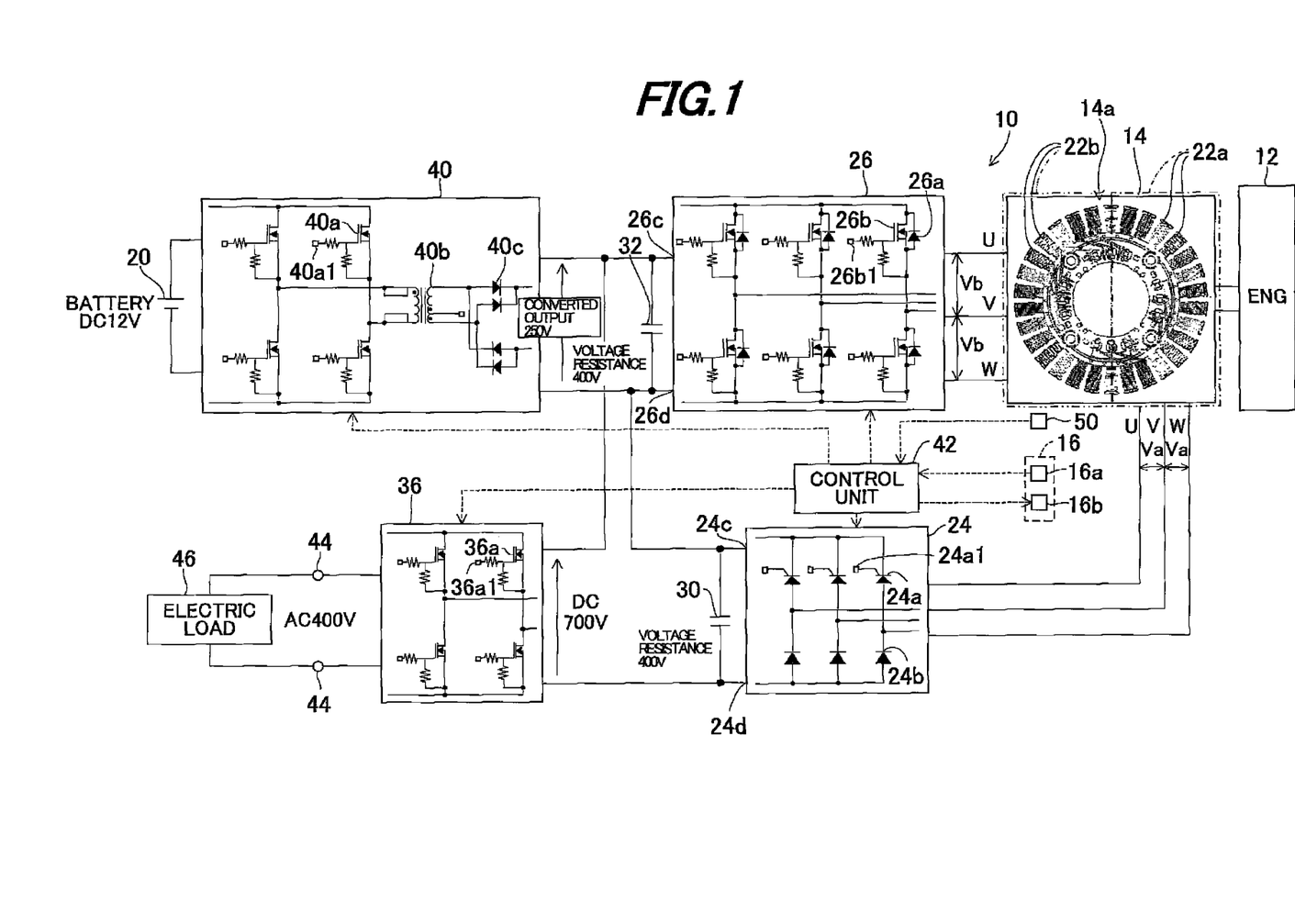
FIG. 1 is an overall block diagram showing an inverter generator according to a first embodiment of the invention.
Figure 6:
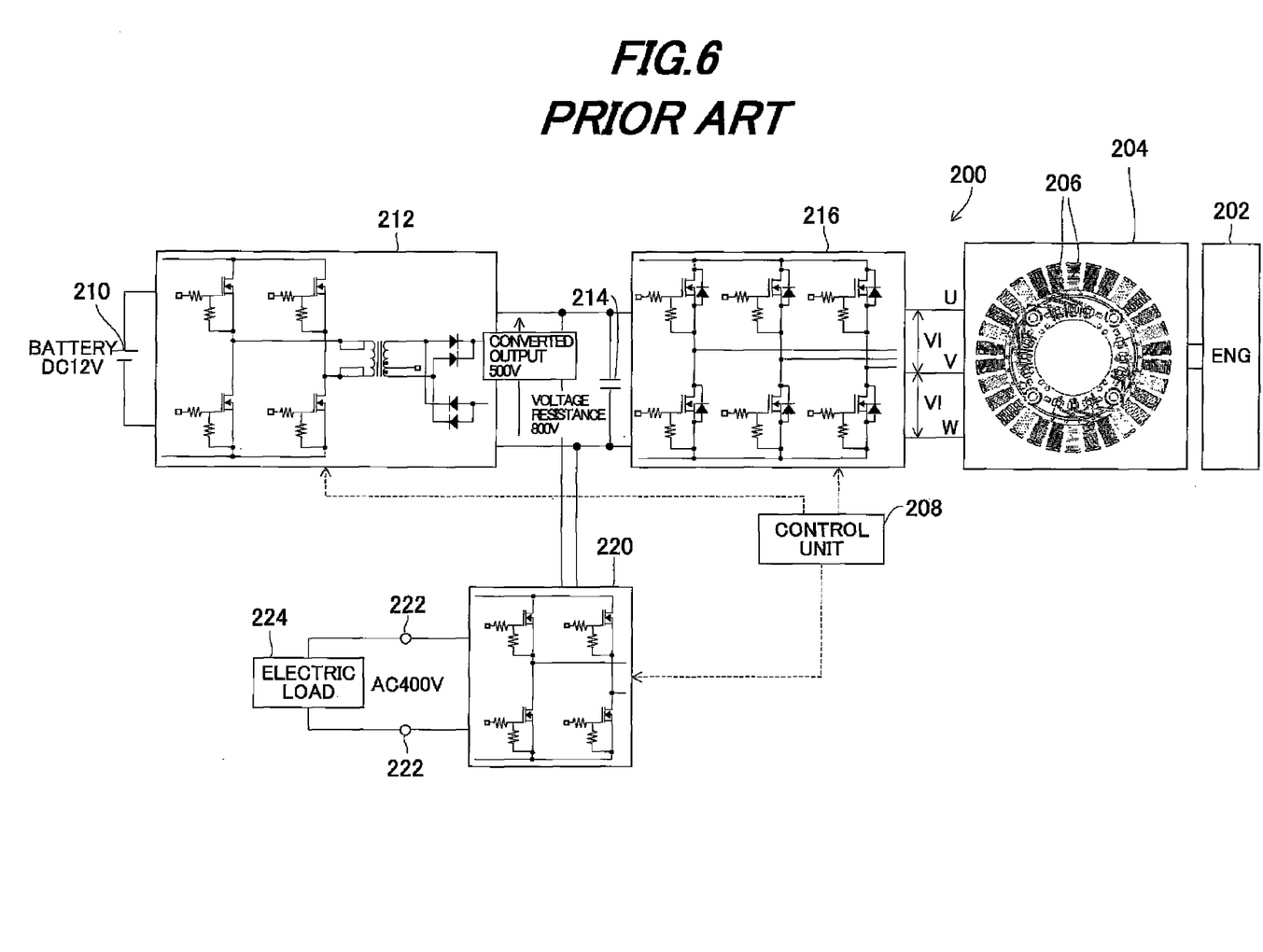
FIG. 6 is an overall block diagram similar to FIG. 1, but showing an inverter generator according to a conventional technique.

FIG. 1 is an overall block diagram showing an inverter generator according to a first embodiment of the invention. FIG. 6 is an overall block diagram similar to FIG. 1, but showing an inverter generator according to a conventional technique.

As shown in FIG. 6, an inverter generator 200 is equipped with a generator unit (starter generator) 204 driven by an engine 202 and has a rated output voltage of AC 400V (maximum voltage: 750V). The generator unit 204 is wound by an output winding 206 and a line-to-line voltage V1 to be generated at the output winding 206 (i.e., an output voltage of the generator unit 204) when power is generated is defined by the rated output voltage of the inverter generator 200, specifically, 500V. The line-to-line voltage defined in accordance with the rated output voltage of the generator is hereinafter called the "defined line-to-line voltage."

The engine 202 is started upon rotating operation of the generator unit 204. To be more specific, a control unit 208 having a CPU, etc., boosts a DC voltage (12V) outputted from a battery 210 to 500V through a DC/DC converter 212 and inputs the boosted output through a smoothing capacitor 214 to a converter 216 that functions as a starter driver. The control unit 208 supplies the output winding 206 wound around the generator unit 204 with the battery output inputted to the converter 216 so as to rotate a rotor (not shown) of the generator unit 204, which rotor doubles as a flywheel of the engine 202, thereby starting the engine 202.

When the engine 202 is started and the generator unit 204 starts generating power, the control unit 208 converts an alternating current outputted from the output winding 206 of the generator unit 204 (at this time, the line-to-line voltage V1 is 500V) into a direct current through the converter 216. After smoothing it through the smoothing capacitor 214, the control unit 208 inputs it to an inverter 220 where the direct current is inverted to the alternating current of 400V having a predetermined frequency (more exactly, 50 Hz or 60 Hz), and then supplies it to an electric load 224 through output terminals 222.

Figure 7:
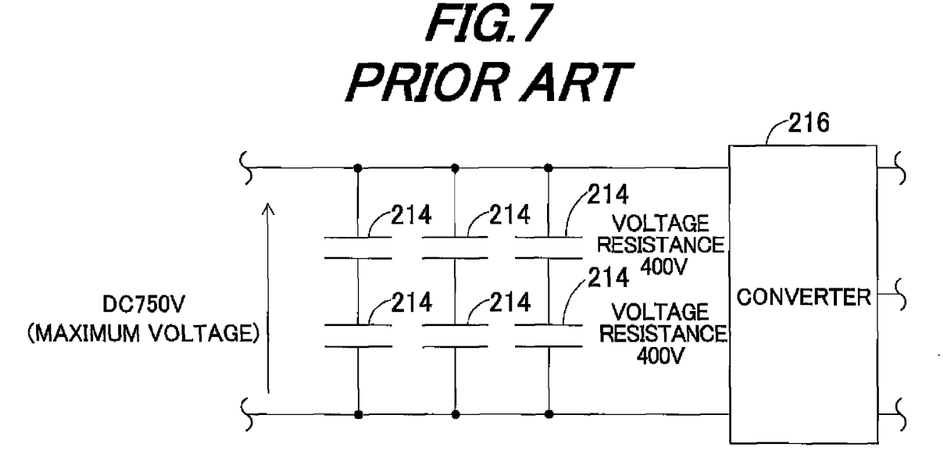
FIG. 7 is a block diagram for explaining a capacitor shown in FIG. 6.

Since the smoothing capacitor 214 is applied with a relatively high voltage, a voltage-endurance value thereof is set comparatively high (e.g., 800V). Further, although one smoothing capacitor 214 is shown in FIG. 6, a general-type capacitor mountable on a printed circuit board has the voltage-endurance value of 500V or less. Therefore, a plurality of capacitors are actually used as shown in FIG. 7, i.e., for example, pairs of series-connected smoothing capacitors 214 having the voltage-endurance value of 400V are connected in parallel to satisfy the necessary capacitance (i.e., three pairs are connected in FIG. 7).

Based on the configuration of the conventional inverter generator 200, the explanation on FIG. 1 will be made. In FIG. 1, symbol 10 designates an inverter generator. The generator 10 is equipped with an engine (internal combustion engine) 12, a generator unit (starter generator) 14 driven by the engine 12, and a manipulation unit 16 installed to be manipulatable by the operator (user). The generator 10 has a relatively high rated output, i.e., a rated output voltage of AC 400V.

The engine 12 is an air-cooled, spark-ignition gasoline engine with a displacement of 390 cc, for instance. The engine 12 is connected to a battery 20 that outputs a DC voltage of rated 12V and is used as a power source for operating a throttle motor, ignition plug (neither shown), etc.

Figure 2:
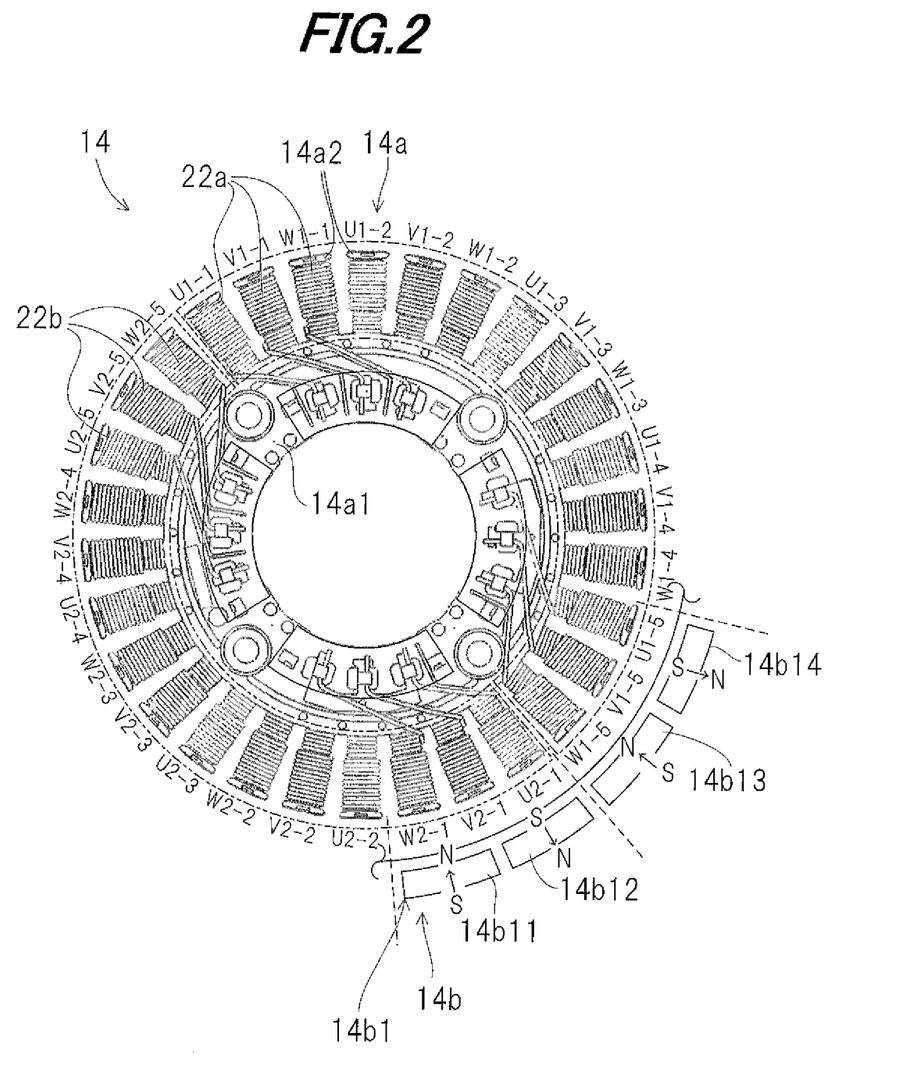
FIG. 2 is a plan view showing a stator and the like constituting a generator unit shown in FIG. 1.

FIG. 2 is a plan view showing a stator and the like constituting the generator unit 14.

The generator unit 14 includes a stator 14a fixed at a crankcase (not shown) of the engine 12 and a rotor 14b which is rotatably installed around the stator 14a and functions also as a flywheel of the engine 12.

The stator 14a has a stator core 14a1 that is formed with a plurality of, i.e., thirty projections (teeth) 14a2 arranged radially. As illustrated, out of the thirty projections 14a2, a half, i.e., fifteen projections 14a2 are wound by first three-phase output winding (hereinafter called the "first winding"; surrounded by a dotted and dashed line in FIG. 1) 22a of U, V, and W-phase, while the remaining fifteen projections 14a2 are similarly wound by second three-phase output winding (hereinafter called the "second winding"; surrounded by a two dotted and dashed line in FIG. 1) 22b of U, V, and W-phase.

The first and second windings 22a, 22b are designed so that line-to-line voltages Va, Vb set lower than the defined line-to-line voltage (500V) are generated, respectively. Specifically, the line-to-line voltages Va, Vb are set to values of about fifty percent (50%; more precisely, just 50%) of the defined line-to-line voltage, for instance. In other words, the line-to-line voltages Va, Vb generated at the first and second windings 22a, 22b are the same and set to 250V (maximum voltage: 375V) that corresponds to about 50% of the defined line-to-line voltage, i.e., of the voltage generated at the conventional output winding 206.

The line-to-line voltages Va, Vb generated at the windings can be decreased by, for instance, decreasing the numbers of turns of the first and second windings 22a, 22b relative to the output winding 206. Thus the winding of the generator unit 14 is divided into two systems of the first and second windings 22a, 22b having low line-to-line voltages.

The inside of the rotor 14b is attached with ten pairs of, i.e., twenty permanent magnet pieces 14b1 to face the first and second windings 22a, 22b with their radially oriented polarities reversed alternately as illustrated (partially shown in FIG. 2). The permanent magnet pieces 14b1 are arranged so that every pair thereof (e.g., 14b11 and 14b12) corresponds to every three projections 14a2.

When the permanent magnet pieces 14b1 of the rotor 14b are rotated around the stator 14a, a three-phase (U, V and W-phase) alternating current is outputted from (generated at) each of the first and second windings 22a, 22b.

Returning to the explanation on FIG. 1, the generator 10 is further equipped with a first converter (rectifier) 24 connected to the first winding 22a, a second converter (rectifier) 26 connected to the second winding 22b, first and second smoothing capacitors 30, 32 respectively connected to the first and second converters 24, 26, an inverter 36 connected at a stage downstream of the first and second converters 24, 26, a DC/DC converter 40 connected to the battery 20, and a control unit 42 adapted to control operations of the first converter 24, inverter 36, etc. Note that, in the embodiments, a term of "downstream" means it in a current flow from the generator unit 14 during power generation.

The first converter 24 has bridge-connected three pairs of thyristors 24a and diodes 24b and gate terminals 24a1 of the thyristors 24a are connected to the battery 20 through the control unit 42. In accordance with a turn-on angle of the thyristor 24a controlled by the control unit 42, the first converter 24 converts the alternating current outputted from the first winding 22a to the direct current and outputs it from positive and negative output terminals 24c, 24d.

The second converter 26 is connected at its input side with the second winding 22b and at its output side with the output terminal, i.e., the positive output terminal 24c of the first converter 24 in series. The second converter 26 has a circuit containing bridge-connected six Field Effect Transistors (FETs; switching elements) 26b including body diodes 26a, and gate terminals 26b1 of the FETs 26b are connected to the battery 20. In response to the operations (i.e., turning-on and turning-off (conducted and not-conducted modes)) of the FETs 26b controlled by the control unit 42, with the use of the body diodes 26a, the second converter 26 converts the alternating current outputted from the second winding 22b to the direct current and outputs it from positive and negative output terminals 26c, 26d.

The second converter 26 also functions as a starter driver (starter/generator driver) that operates the second winding 22b so as to work as a starter of the engine 12 in addition to its function as a generator. Specifically, in this embodiment, the second winding 22b is supplied with a current to rotate the generator unit 14 to start the engine 12, i.e., the generator unit 14 functions as the generator (starter motor).

To be more specific, upon the operations of the FETs 26b controlled by the control unit 42, the second converter (starter driver) 26 supplies the output of the battery 20 to the second winding 22b to rotate the generator unit 14 to start the engine 12. Note that, at the engine start, the battery output is inputted from the output terminals 26c, 26d, in other words, the output terminals 26c, 26d function as input terminals.

The first smoothing capacitor 30 is connected at a stage downstream of the first converter 24 to smooth the direct current outputted from the first converter 24. Similarly, the second smoothing capacitor 32 is connected at a stage downstream of the second converter 26 to smooth the direct current outputted from the second converter 26.

Since the first and second smoothing capacitors 30, 32 are inputted with the outputs of the first and second windings 22a, 22b whose line-to-line voltages Va, Vb are set relatively low, relatively low voltage-endurance values suffice for the capacitors 30, 32. For example, the voltage-endurance values are set to 40V that corresponds to about 50% of the voltage-endurance value of the conventional smoothing capacitor 214 shown in FIG. 6.

An input side of the inverter 36 is connected to the series-connected first and second converters 24, 26. The inverter 36 has a circuit including bridge-connected four FETs 36a, and gates 36a1 of the FETs 36a are connected to the battery 20. In response to the operations (i.e., turning-on and turning-off (conducted and not-conducted modes)) of the FETs 36a controlled by the control unit 42, the inverter 36 inverts the direct currents outputted from the first and second converters 24, 26 to a single-phase alternating current of the predetermined frequency (50 Hz or 60 Hz commercial frequency).

The inverter 36 outputs the alternating currents from output terminals 44 through filters (not shown) that remove harmonic components of the alternating current, and supplies them to an electric load 46 through a connector (not shown), etc.

The DC/DC converter 40 is connected at its input side with the battery 20 and at its output side with the positive and negative output terminals 26c, 26d (functioning as the input terminals here, as mentioned above) of the second converter 26.

The DC/DC converter 40 comprises an insulating type DC/DC converter having bridge-connected four FETs 40a, a transformer 40b and diodes 40c, and gates 40a1 of the FETs 40a are connected to the battery 20. In response to the operations of the FETs 40a controlled by the control unit 42, the DC/DC converter 40 boosts the DC voltage outputted from the battery 20 and outputs it at the engine start, while, after the engine start, it steps down the voltage of the direct current generated at the second winding 22b of the generator unit 14 and outputted from the second converter 26 and supplies it to the battery 20 to charge it.

The control unit 42 has a CPU and the like and controls the operations of the first converter 24, second converter (starter driver) 26, inverter 36, etc., as mentioned above. The control unit 42 is connected to the battery 20 and supplied with operating power therefrom. Although not illustrated, a transformer and rectifier circuit are connected to an output stage of one phase from among the U, V and W-phases outputted from the first winding 22a, and power stepped down and rectified therethrough is also supplied to the control unit 42, etc. Specifically, the battery output and part of power generated at the first winding 22a are used as control power, i.e., used for controlling the operations.

The manipulation unit 16 has a start and stop switch 16a that outputs a start command (ON) and stop command (OFF) of the generator 10 upon manipulation by the operator, and a display unit (e.g., an output indicating light, overload warning light, liquid crystal panel, etc.) 16b that displays the operating condition, etc., of the generator 10. The output of the start and stop switch 16a is sent to the control unit 42 and the operation of the display unit 16b (such as turning-on and off of the output indicating light) is controlled by the control unit 42.

A crank angle sensor 50 comprising an electromagnetic pickup is installed near the flywheel, i.e., the rotor 14b of the engine 12 to produce a pulse signal at every predetermined crank angular position and output it to the control unit 42. Although not illustrated, the generator 10 has further various sensors for detecting the voltage and current of power outputted from the inverter 36 and outputs of those sensors are also sent to the control unit 42.

Figure 3:
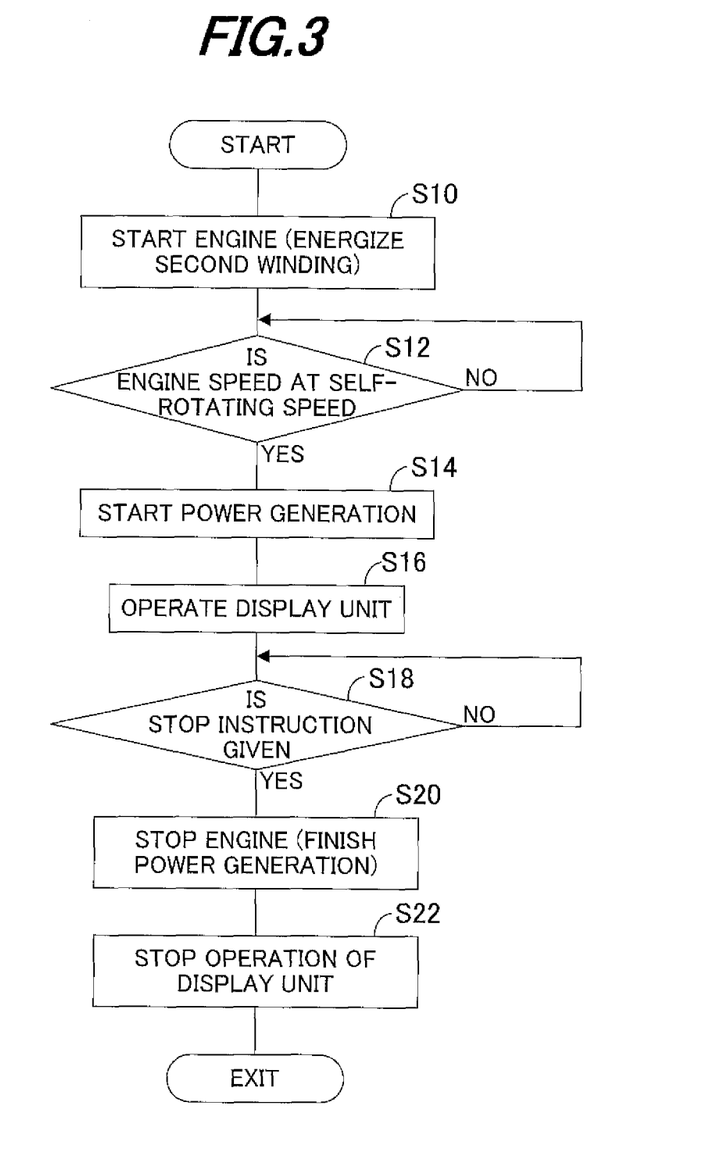
FIG. 3 is a flowchart showing the operation of a control unit shown in FIG. 1.
Figure 4:
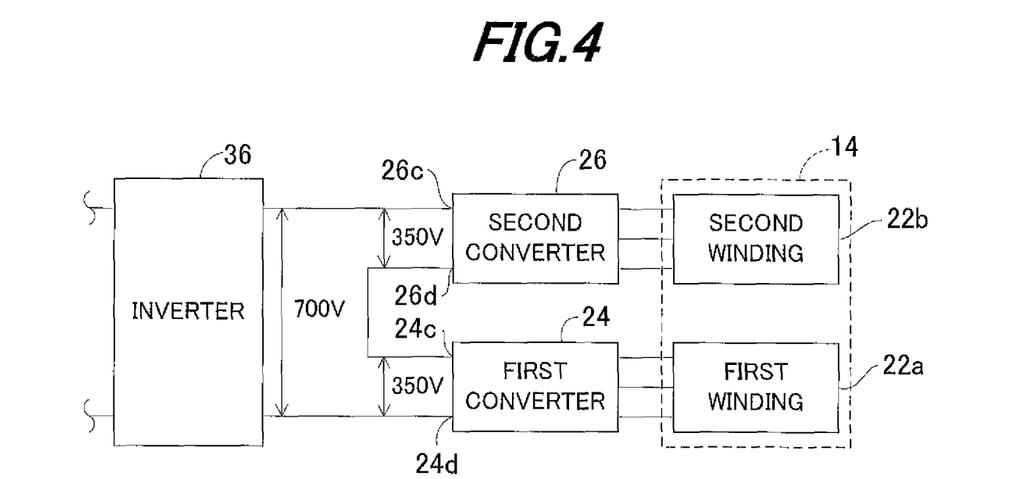
FIG. 4 is a block diagram for explaining a voltage inputted to an inverter shown in FIG. 1.

FIG. 3 is a flowchart showing the operation of the control unit 42 of the generator 10. The illustrated program is executed upon turning on the start and stop switch 16a.

The program begins at S (Step; Processing step) 10 in which the second winding 22b is supplied with the output of the battery 20 (i.e., are energized) to rotate the generator unit 14 to start the engine 12.

Specifically, the output DC voltage (12V) of the battery 20 is boosted to 250V or thereabout by the DC/DC converter 40 and sent to the second converter (starter driver) 26. The second converter 26 serving as the starter driver supplies the boosted battery output to the second winding 22b, whereby the rotor 14b of the generator unit 14 is rotated relative to the stator 14a to start the engine 12.

Here, the boosting operation of the DC/DC converter 40 is explained in detail. In the case where the line-to-line voltage Vb of the second winding 22b is set to 500V (defined line-to-line voltage) that is the same as the line-to-line voltage of the conventional output winding 206, the voltage that enables the rotating operation of the generator unit 14 (i.e., the voltage enough to acquire sufficient torque for making the generator unit 14 work as the starter motor) is to be about 500V. In this case, as explained in relation to the conventional DC/DC converter 212 (corresponding to the converter 40 in the embodiments), it is necessary to boost the battery voltage (12V) to 500V, so that the boost ratio rises and the converter size is increased accordingly.

However, in this embodiment, the line-to-line voltage Vb of the second winding 22b is set to 250V that corresponds to about 50% of the line-to-line voltage of the conventional output winding 206. Consequently, the necessary voltage that enables the rotating operation of the generator unit 14 can be about 250V, so that it suffices if the DC/DC converter 40 boosts the battery voltage to 250V. As a result, the boost ratio of the DC/DC converter 40 can be suppressed and the converter size can be made compact accordingly.

The explanation on FIG. 3 will be resumed. The program proceeds to S12 in which a time period between the output pulses of the crank angle sensor 50 are counted or measured to detect (calculate) an engine speed NE and it is determined whether the detected engine speed NE has reached a self-rotating speed, i.e., whether the starting operation of the engine 12 has been completed.

As long as the result in S12 is negative, the processing of S12 is repeated, while when the result is affirmative, the program proceeds to S14 in which the power generation at the generator unit 14 is started and the generated power is supplied to the electric load 46 by controlling the operations of the first converter 24, inverter 36, etc.

Specifically, three-phase AC power (250V) outputted from (generated at) the first winding 22a of the generator unit 14 is inputted to the first converter 24 and the first converter 24 converts the inputted alternating current to a direct current (350V) and outputs it. The direct current outputted from the first converter 24 is smoothed through the first smoothing capacitor 30.

On the other hand, three-phase AC power (250V) outputted from (generated at) the second winding 22b of the generator unit 14 is inputted to the second converter 26 and the second converter 26 converts the inputted alternating current to a direct current (350V) using the body diodes 26a and outputs it. The direct current outputted from the second converter 26 is smoothed through the second smoothing capacitor 32.

Since the output side of the second converter 26 is series-connected with the positive output terminal 24c of the first converter 24, the inverter 36 is inputted with a sum of the direct current (350V) from the first converter 24 and the direct current (350V) from the second converter 26, i.e., a direct current (superimposed current) of 700V.

The inverter 36 inverts the inputted direct current to a single-phase alternating current (AC 400V) of the predetermined frequency and supplies it from the output terminals 44 through the filters (not shown) to the electric load 46.

Next the program proceeds to S16 in which the display unit 16b is operated, for instance, the output indicating light is turned on, to inform the operator that the power generation has been started. Then the program proceeds to S18 in which it is determined whether an instruction to stop the generator 10 is given by the operator, i.e., whether the start and stop switch 16a is turned OFF.

When the result in S18 is negative, the processing of S18 is again carried out, while when the result is affirmative, the program proceeds to S20 in which the engine 12 is stopped through ignition-cut or the like and the power generation at the generator unit 14 is finished. Next the program proceeds to S22 in which the operation of the display unit 16b is stopped, for instance, the output indicating light is turned off.

As stated above, the first embodiment is configured to have an inverter generator (10) having a winding (first or second winding 22a, 22b) wound around a generator unit (14) driven by an engine (12), a converter (first or second converter 24, 26) connected to the winding and adapted to convert an alternating current outputted from the winding to a direct current, an inverter (36) connected to the converter and adapted to invert the direct current outputted from the converter to an alternating current and output it, and a controller (control unit 42) adapted to control operations of the converter and the inverter, wherein the improvement comprises: a battery (20) connected to the engine, and the winding includes a first winding (22a) and a second winding (22b), such that the controller (42) supplies an output of the battery to one of the first winding and the second winding (more exactly, the second winding 22b) to rotate the generator unit to start the engine, in other words, it is configured so that the winding is divided into the first and second windings.

With this, the line-to-line voltages Va, Vb of the first and second windings 22a, 22b can be set to a value (250V) smaller than the defined line-to-line voltage (500V) for example, and it makes possible to use the generator unit 14 to start the engine 12. More exactly, a relatively low voltage is supplied to one of the first and second windings 22a, 22b (i.e., second winding 22b) to rotate the generator unit 14, thereby enabling to start the engine 12. Consequently, for example, the boost ratio of the converter (DC/DC converter 40) that boosts the battery voltage and supplies it to one of the first and second windings 22a, 22b (second winding 22b) can be suppressed, so that it becomes possible to improve efficiency of the converter 40 and reduce the converter size, thereby making the whole generator light and compact. Further, since a starter motor or the like used for start-up is not required, the whole generator can be made more compact.

Further, since the line-to-line voltages Va, Vb of the first and second windings 22a, 22b are set as explained above, the voltage-endurance value of parts (e.g., the first and second smoothing capacitors 30, 32, etc.) to which the output voltage is applied from the generator unit (first and second windings 22a, 22b) at power generation can be decreased to 400V for example. Therefore, a plurality of capacitors as installed in the conventional generator shown in FIG. 7 are not necessary, so that increase in size and cost can be avoided while the range of choices of capacity of the capacitor can be widened. Further, since the voltage inputted from the first winding 22 to the first converter 24 and that from the second winding 22b to the second converter 26 can be low, the voltage-endurance values of the converters 24, 26 can be decreased accordingly. It is advantageous in terms of cost.

Further, line-to-line voltages (Va, Vb) generated at the first winding and the second winding are same and set lower than a defined line-to-line voltage (500V) defined by a rated output voltage (AC 400V) of the inverter generator, and the converter includes: a first converter (24) connected to the first winding and adapted to convert an alternating current outputted from the first winding to a direct current; and a second converter (26) connected at is input side with the second winding and at its output side with an output terminal (more exactly, the positive output terminal 24c) of the first converter in series and adapted to convert an alternating current outputted from the second winding to a direct current and output it.

With this, in addition to the above effects, since a sum of the direct current from the first converter 24 and the direct current from the second converter 26 is inputted to the inverter 36 and the inverter 36 inverts it to the alternating current and outputs it, even when the line-to-line voltages Va, Vb of the first and second windings 22a, 22b are set low, the rated output of the generator 10 does not decrease.

Further, the line-to-line voltages of the first winding and the second winding are set to about fifty percent of the defined line-to-line voltage. Specifically, the numbers of turns of the first and second windings 22a, 22b are set to be about 50% of the necessary number of turns for obtaining the defined line-to-line voltage, more specifically, to be about 50% of the number of turns of the conventional output winding 206. With this, in addition to the above effects, the boost ratio of the converter (DC/DC converter 40) that boosts the battery voltage and supplies it to the first and second windings 22a, 22b can be 50% of the conventional value. As a result, it becomes possible to further improve efficiency of the converter 40 and reduce the converter size, thereby making the whole generator lighter and more compact.

An inverter generator according to a second embodiment of this invention will now be explained.

Figure 5:
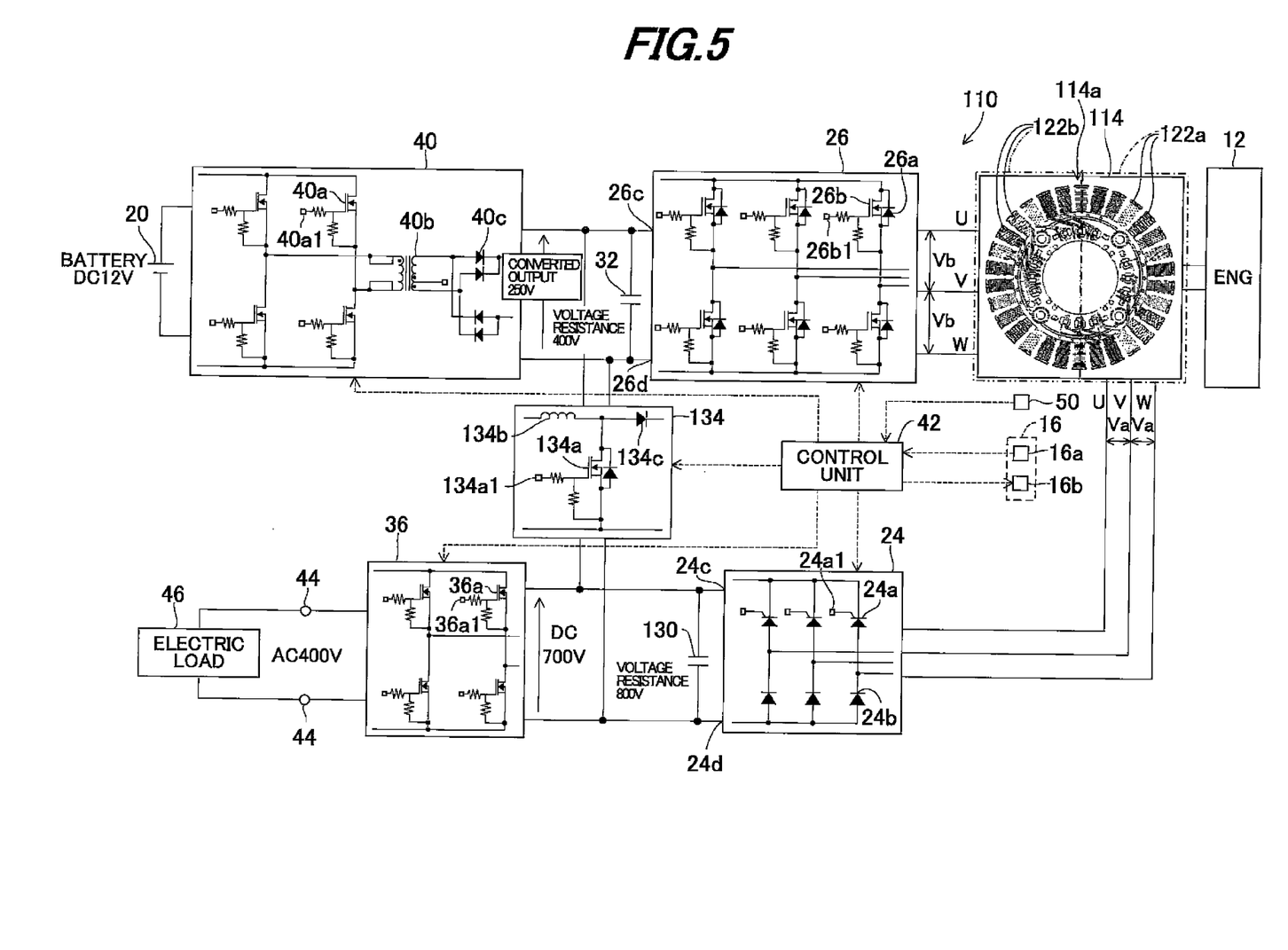
FIG. 5 is an overall block diagram similar to FIG. 1, but showing an inverter generator according to a second embodiment of the invention.

The explanation of the second embodiment will focus on the points of difference from the first embodiment. In the second embodiment, a line-to-line voltage Va of a first winding 122a is set to the defined line-to-line voltage while a line-to-line voltage Vb of a second winding 122b is set lower than that of the first winding 122a, and the output of the battery 20 is supplied to the second winding 122b to start the engine 12.

FIG. 5 is an overall block diagram similar to FIG. 1, but showing the inverter generator 110 according to the second embodiment of the invention. Note that constituent elements corresponding to those of the first embodiment are assigned by the same reference symbols as those in the first embodiment and will not be explained.

As shown in FIG. 5, windings of a generator unit 114 include the first winding 122a and second winding 122b, similarly to the first embodiment. The first winding 122a is designed so that the line-to-line voltage (defined line-to-line voltage) Va generated at power generation is set to 500V (maximum voltage: 750V) that is the same as the voltage generated at the conventional output winding 206. The line-to-line voltage Vb generated at the second winding 122b is set lower than that of the first winding 122a, more exactly, set to a value of about 50% (more precisely, just 50%) of the voltage Va of the first winding 122a. In other words, the line-to-line voltage Vb of the second winding 122b is 250V (maximum voltage: 375V) that corresponds to about 50% of the voltage of the conventional output winding 206.

The line-to-line voltage Vb generated at the second winding 122b can be decreased by, for instance, decreasing the number of turns of the second winding 122b to be smaller than that of the first winding 122a. Thus, the winding of the generator unit 114 in the second embodiment is divided into two systems of the first and second windings 122a, 122b having different line-to-line voltages.

The generator 110 is equipped with the first converter 24 connected to the first winding 122a, the second converter 26 connected to the second winding 122b, a first smoothing capacitor 130 and the second smoothing capacitor 32 respectively connected to the first and second converters 24, 26, a boost converter 134 connected at a stage downstream of the second smoothing capacitor 32, and the inverter 36 connected at a stage downstream of the first converter 24 and boost converter 134.

The first smoothing capacitor 130 is connected at a stage downstream of the first converter 24 to smooth the direct current outputted from the first converter 24. The voltage-endurance value of the first smoothing capacitor 130 is set relatively high, more exactly, for instance, to 800V that is the same as that of the conventional smoothing capacitor 214.

Since the second smoothing capacitor 32 is inputted with the output of the second winding 22b whose line-to-line voltage Vb is set relatively low similarly to the first embodiment, the voltage-endurance value of lower than that of the first smoothing capacitor 130 suffices for the second smoothing capacitor 32. For example, the voltage-endurance value of the second smoothing capacitor 32 is set to 400V that corresponds to about 50% of that of the first smoothing capacitor 130, i.e., of the conventional smoothing capacitor 214 shown in FIG. 6.

The boost converter 134 is parallel-connected at its input side with the positive and negative output terminals 26c, 26d of the second converter and at its output side between the positive and negative output terminals 24c, 24d of the first converter 24. As is clear from FIG. 5, connection points of the boost converter 134 on the input and output sides are positioned downstream of the first and second smoothing capacitors 130, 32.

The boost converter 134 includes a chopper type DC/DC converter having an FET 134a, choke coil 134b and diode 134c, and a gate 134a1 of the FET 134a is connected to the battery 20. In response to the operation of the FET 134a controlled by the control unit 42, the boost converter 134 boosts the voltage of the direct current outputted from the second converter 26 and outputs it.

The inverter 36 is connected at its input side with the first converter 24 and boost converter 134. In response to turning-on and turning-off of the FETs 36a controlled by the control unit 42, the inverter 36 inverts the direct currents outputted from the first converter 24 and boost converter 134 to single-phase alternating currents of the predetermined frequency (50 Hz or 60 Hz commercial frequency).

The operation of the control unit 42 of the generator 110 according to the second embodiment will be explained with reference to the FIG. 3 flowchart. First, in S10, the second winding 122b is supplied with the output of the battery 20 (i.e., are energized) to rotate the generator unit 114 to start the engine 12.

Specifically, similarly to the first embodiment, the output DC voltage of the battery 20 is boosted by the DC/DC converter 40 and the boosted battery output is supplied to the second winding 122b, whereby the rotor 114b of the generator unit 114 is rotated relative to the stator 114a to start the engine 12.

As mentioned above, since the line-to-line voltage Vb of the second winding 122b is set to 250V that corresponds to about 50% of the line-to-line voltage of the conventional output winding 206, i.e., of the line-to-line voltage Va of the first winding 122a, it suffices if the DC/DC converter 40 boosts the battery voltage to 250V.

Next the program proceeds to S12 and when the result in S12 is affirmative, proceeds to S14 in which the power generation at the generator unit 114 is started. Specifically, three-phase AC power (500V) outputted from (generated at) the first winding 122a of the generator unit 114 is inputted to the first converter 24 and the first converter 24 converts the inputted alternating current to a direct current (700V) and outputs it. The direct current outputted from the first converter 24 is smoothed through the first smoothing capacitor 130 and inputted to the inverter 36.

On the other hand, three-phase AC power (250V) outputted from (generated) the second winding 122b of the generator unit 114 is inputted to the second converter 26 and the second converter 26 converts it to a direct current (350V) and outputs it.

The direct current outputted from the second converter 26 is smoothed through the second smoothing capacitor 32 and inputted to the boost converter 134. The boost converter 134 boosts the DC voltage from the second converter 26 to a double, i.e., 700V and outputs it to the inverter 36. Consequently, the inverter 36 is inputted with a superimposed current that is a sum of the direct current from the first converter 24 and the direct current from the boost converter 134.

The inverter 36 inverts the inputted direct current to a single-phase alternating current (AC 400V) of the predetermined frequency and supplies it from the output terminals 44 through the filters to the electric load 46.

Then the steps of S16 to S22 are processed, whereafter the program is terminated.

As stated above, in the second embodiment, a line-to-line voltage (Vb) of the second winding (122b) is set lower than a line-to-line voltage (Va) of the first winding (122a). With this, it becomes possible to start the engine 12 through the rotating operation of the generator unit 114 upon supplying a relatively low voltage to the second winding 122b. Consequently, for example, the boost ratio of the DC/DC converter 40 that boosts the battery voltage and supplies it to the second winding 122b can be reliably suppressed, so that it becomes possible to further improve efficiency of the DC/DC converter 40 and reduce the converter size, thereby making the whole generator light and compact.

Further, the converter includes a first converter (24) connected to the first winding and adapted to convert an alternating current outputted from the first winding to a direct current; and a boost converter (134) connected at its input side with a second converter (26) that connected to the second winding and adapted to convert an alternating current outputted from the second winding to a direct current and parallel-connected at its output side between positive and negative output terminals (24c, 24d) of the first converter, and adapted to boost a voltage of a direct current outputted from the second converter and output it.

Specifically, the alternating current from the second winding 122b is converted to the direct current through the second converter 26 and the voltage of the direct current is boosted by the boost converter 134 and outputted between the positive and negative output terminals 24c, 24d of the first converter 24. With this, since the direct current from the first converter 24 and the direct current from the boost converter 134 are superimposed and inputted to the inverter 36 and the inverter 36 inverts it to the alternating current and outputs it, even when the line-to-line voltage Vb of the second winding 22b is set low, the rated output of the generator 110 does not decrease. Further, since the line-to-line voltage Vb of the second winding 122b is set as explained above, the voltage inputted from the second winding 122b to the second converter 26 can be low, so that the voltage-endurance value of the second converter 26 can be decreased accordingly. It is advantageous in terms of cost.

Further, the controller (42) supplies the output of the battery (20) to the second winding to rotate the generator unit (114) to start the engine (12). With this, it becomes possible to reliably start the engine 12 through the rotating operation of the generator unit 114 upon supplying a relatively low voltage to the second winding 122b.

Further, the line-to-line voltage of the second winding is set to about fifty percent of the line-to-line voltage of the first winding. Since, accordingly, the boost ratio of the DC/DC converter 40 that boosts the battery voltage and supplies it to the second winding 122b can be made about 50%, it becomes possible to further improve efficiency of the DC/DC converter 40 and reduce the converter size, thereby making the whole generator lighter and more compact.

Further, the line-to-line voltage of the second winding is set lower than the line-to-line voltage of the first winding by setting number of turns of the second winding smaller than that of the first winding. With this, it becomes possible to set the line-to-line voltage Vb of the second winding 122b to be smaller than the line-to-line voltage Va of the first winding 122a with simple structure.

The remaining configuration is the same as that in the first embodiment, so the explanation thereof is omitted.

As stated above, in the first and second embodiments, it is configured to have an inverter generator (10, 110) having a winding (first winding 22a, 122a, second winding 22b, 122b) wound around a generator unit (14, 114) driven by an engine (12), a converter (first converter 24, second converter 26) connected to the winding and adapted to convert an alternating current outputted from the winding to a direct current, an inverter (36) connected to the converter and adapted to invert the direct current outputted from the converter to an alternating current and output it, and a controller (control unit 42) adapted to control operations of the converter and the inverter, wherein the improvement comprises: a battery (20) connected to the engine, and the winding includes a first winding (22a, 122a) and a second winding (22b, 122b), such that the controller supplies an output of the battery to one of the first winding and the second winding to rotate the generator unit (14, 114) to start the engine.

In the first embodiment, line-to-line voltages (Va, Vb) generated at the first winding and the second winding are same and set (to 250V) lower than a defined line-to-line voltage (500V) defined by a rated output voltage of the inverter generator, and the converter includes: a first converter (24) connected to the first winding and adapted to convert an alternating current outputted from the first winding to a direct current; and a second converter (26) connected at is input side with the second winding and at its output side with an output terminal (positive output terminal 24c) of the first converter in series and adapted to convert an alternating current outputted from the second winding to a direct current and output it.

Further, the line-to-line voltages of the first winding and the second winding are set to about fifty percent of the defined line-to-line voltage.

In the second embodiment, a line-to-line voltage (Vb) of the second winding (122b) is set lower than a line-to-line voltage (Va) of the first winding (122a), and the converter includes: a first converter (24) connected to the first winding and adapted to convert an alternating current outputted from the first winding to a direct current; and a boost converter (134) connected at its input side with a second converter (26) that connected to the second winding and adapted to convert an alternating current outputted from the second winding to a direct current and parallel-connected at its output side between positive and negative output terminals (24c, 24d) of the first converter, and adapted to boost a voltage of a direct current outputted from the second converter and output it.

Further, the controller supplies the output of the battery to the second winding to rotate the generator unit (114) to start the engine.

Further, the line-to-line voltage of the second winding is set to about fifty percent of the line-to-line voltage of the first winding.

Further, the line-to-line voltage of the second winding is set lower than the line-to-line voltage of the first winding by setting number of turns of the second winding smaller than that of the first winding.

It should be noted that, although the FETs are used as the switching elements of the second converter 26, etc., in the foregoing, this is not a limitation and insulated gate bipolar transistors (IGBTs) or the like may be used instead.

It should also be noted that, in the first embodiment, although the output of the battery 20 is supplied to the second winding 22b to start the engine 12, it may be configured to use the first converter 24 as the starter driver, in which the battery output is supplied to the first winding 22a to start the engine 12.

It should also be noted that, although the line-to-line voltages Va, Vb of the first and second windings 22a, 122a, 22b, 122b, the rated output voltage of the inverter generator 10, 110, and other values are indicated with specific values in the foregoing, they are only examples and not limited thereto.

Japanese Patent Application Nos. 2011-110565 and 2011-110566, both filed on May 17, 2011, are incorporated by reference herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An inverter generator, comprising:
 a winding wound around a generator unit driven by an engine,
 a converter connected to the winding and adapted to convert an alternating current outputted from the winding to a direct current,
 an inverter connected to the converter and adapted to invert the direct current outputted from the converter to an alternating current and output the alternating current,
 a controller adapted to control operations of the converter and the inverter, and
 a battery connected to the engine,
 wherein the winding includes a first winding and a second winding, such that the controller supplies an output of the battery to one of the first winding and the second winding to rotate the generator unit to start the engine, and
 wherein the converter includes:
  a first converter connected to the first winding and adapted to convert an alternating current outputted from the first winding to a direct current; and
  a second converter connected at an input side with the second winding and at an output side with an output terminal of the first converter in series and adapted to convert an alternating current outputted from the second winding to a direct current and output the direct current.

2. The inverter generator according to claim 1, wherein line-to-line voltages generated at the first winding and the second winding are same and set lower than a defined line-to-line voltage defined by a rated output voltage of the inverter generator.

3. The inverter generator according to claim 2, wherein the line-to-line voltages of the first winding and the second winding are set to about fifty percent of the defined line-to-line voltage.

4. An inverter generator, comprising:
- a winding wound around a generator unit driven by an engine,
- a converter connected to the winding and adapted to convert an alternating current outputted from the winding to a direct current,
- an inverter connected to the converter and adapted to invert the direct current outputted from the converter to an alternating current and output the alternating current,
- a controller adapted to control operations of the converter and the inverter, and
- a battery connected to the engine,
- wherein the winding includes a first winding and a second winding, such that the controller supplies an output of the battery to one of the first winding and the second winding to rotate the generator unit to start the engine,
- wherein the converter includes:
  - a first converter connected to the first winding and adapted to convert an alternating current outputted from the first winding to a direct current; and
  - a boost converter connected at an input side with a second converter that connected to the second winding and adapted to convert an alternating current outputted from the second winding to a direct current and parallel-connected at an output side between positive and negative output terminals of the first converter, and adapted to boost a voltage of a direct current outputted from the second converter and output the direct current.

5. The inverter generator according to claim 4, wherein the controller supplies the output of the battery to the second winding to rotate the generator unit to start the engine.

6. The inverter generator according to claim 4, wherein a line-to-line voltage of the second winding is set lower than a line-to-line voltage of the first winding.

7. The inverter generator according to claim 6, wherein the line-to-line voltage of the second winding is set to about fifty percent of the line-to-line voltage of the first winding.

8. The inverter generator according to claim 6, wherein the line-to-line voltage of the second winding is set lower than the line-to-line voltage of the first winding by setting number of turns of the second winding smaller than that of the first winding.

* * * * *